United States Patent
Maile et al.

(10) Patent No.: US 7,682,226 B2
(45) Date of Patent: Mar. 23, 2010

(54) VANE PUMP

(75) Inventors: Bernd Maile, Oggelshausen (DE); Paul Mantz, Ehingen (DE); Martin Staudenrausch, Biberach (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 221 days.

(21) Appl. No.: 11/714,512

(22) Filed: Mar. 6, 2007

(65) Prior Publication Data

US 2008/0045129 A1 Feb. 21, 2008

(30) Foreign Application Priority Data

Mar. 24, 2006 (EP) .................................. 06006166

(51) Int. Cl.
*A22C 11/08* (2006.01)

(52) U.S. Cl. ....................................... 452/41

(58) Field of Classification Search .................... 452/41, 452/40; 418/15, 24, 31, 71, 127, 128, 255, 418/257, 258, 260
See application file for complete search history.

(56) References Cited

U.S. PATENT DOCUMENTS

| | | | | | |
|---|---|---|---|---|---|
| 3,612,733 | A | * | 10/1971 | Wilcox | 418/16 |
| 3,658,446 | A | * | 4/1972 | Jansson | 418/31 |
| 5,102,314 | A | * | 4/1992 | Staudenrausch | 418/15 |
| 5,380,240 | A | * | 1/1995 | Staudenrausch | 452/41 |
| 6,110,033 | A | * | 8/2000 | Frey | 452/40 |
| 6,309,293 | B1 | * | 10/2001 | Zinser et al. | 452/41 |

FOREIGN PATENT DOCUMENTS

| | | |
|---|---|---|
| DE | 2601347 | 7/1977 |
| DE | 0 432 388 A1 | 6/1991 |
| DE | 19916582 | 10/2000 |
| DE | 10319912 | 11/2003 |
| DE | 10324280 | 12/2003 |
| EP | 1 040 758 A1 | 10/2000 |
| FR | 1034534 | 7/1953 |
| GB | 480522 | 2/1938 |
| GB | 591076 | 8/1947 |
| GB | 1022147 | 3/1966 |
| GB | 1178265 | 1/1970 |

OTHER PUBLICATIONS

European Search Report for corresponding International Application No. EP 06 00 6166 (Aug. 28, 2008).
English language translation of Extended European Search Report for Patent No. 06006166.0, dated Sep. 18, 2006.

* cited by examiner

*Primary Examiner*—Thomas Price
(74) *Attorney, Agent, or Firm*—Marshall, Gerstein & Borun LLP

(57) ABSTRACT

A vane pump for delivering pasty masses, in particular sausage meat, with a pump case 6 and a rotatably held rotor 3 comprising vanes 2 held so as to be radially movable which form delivery cells 4 together with the wall 5 of the pump case 6, with a suction area, a pressure area and a sealing area separating the pressure area from the suction area. For a better sealing between the suction area and the sealing area, in particular in case of high pressures in the pressure area, and for increasing the service life of the vane pump, in the sealing area at least one sealing element is provided for sealing a gap between the rotor and the wall of the pump case.

17 Claims, 3 Drawing Sheets

VANE PUMP

CROSS-REFERENCE TO RELATED APPLICATION

The present application claims the benefit of priority of European Patent Application No. 06 006 166.0 filed on Mar. 24, 2006. The entire text of the priority application is incorporated herein by reference in its entirety.

FIELD OF THE DISCLOSURE

The disclosure relates to a vane pump, such as used in meat processing, such as sausage making operations.

BACKGROUND OF THE DISCLOSURE

Vane pumps are already being employed for delivering sausage meat from hoppers into filling tubes via which sausage casings are filled with the sausage meat. Such vane pumps are already described, for example, in the EP 0432388 B2 and the EP 1040758 A1. Vane pumps consist of a pump case and a rotor eccentrically arranged therein which can be caused to rotate. Vanes held so as to be radially movable are arranged in the rotor and form delivery cells together with the wall of the pump case, the bottom and the lid of the case and the outer surface of the rotor and cooperate in a sealing sense. The pump case has a meat inlet and a meat outlet. The area downstream of the inlet to downstream of the outlet corresponds to the pressure area of the pump. In the outlet area, the respective vane cell is in communication with the outlet, so that the pasty mass can be, for example, pushed from the vane cell into the filling tube. In the sense of rotation downstream of the outlet, the sealing area is provided which separates the pressure area from the suction area.

In former solutions of vane pumps, the pressure area is separated from the suction area by a sealing gap generated between rotor and pump case. The sealing gap resulting between the rotor and the case is in the range of only a few hundredths of millimeters. The sealing gap and the sealing function here depend on the geometry as well as the existing tolerances of the delivery mechanism parts. In addition, wear and different performance characteristics, such as delivery pressure, product consistency, etc. have a disadvantageous effect on the uniformity of discharge.

In case of high pressures in the pressure area, the sealing gap increases, e.g. as a result of elastic deformations. Due to the fact that the pressure drop in the sealing gap is proportional to the third power of the gap width s, i.e. $\Delta p \sim s^3$, varying sealing gaps have enormous influence on the leakage flows and thus on the portioning accuracy of the delivery mechanism. In addition, the sealing effect depends on the effective length of the sealing area.

When the sealing effect is decreasing, the leaking mass flowing from the pressure into the suction area increases. This leaking mass can thereby penetrate the area of a vacuum extension provided in the pump case and flow further towards the vacuum pump. Meat deposits in the area of the vacuum extension or in the vacuum channel to the vacuum pump, respectively, can lead to a clogging of the channel or to a damage of the vacuum pump.

Due to the gap width problem, the degree of the evacuation of the product can neither be purposefully influenced. That means, the leakage amount and thus the portioning accuracy depend on the wear condition of the delivery mechanism components and on various performance characteristics, such as delivery pressure, product consistency, etc. With increasing wear and thus decreasing sealing function, expensive delivery mechanism parts have to be replaced, such as rotor, pump case, pump vane, etc., to ensure an adequate sealing function.

SUMMARY OF THE DISCLOSURE

Starting from this situation, the object underlying the present disclosure is to provide a vane pump having an exact discharge and thus portioning accuracy, and which moreover permits prolonged service life.

By at least one sealing element for sealing a gap between the rotor and the wall of the pump case being provided in the sealing area, the sealing function between the pressure and suction areas can be improved. Apart from the sealing property, the sealing element furthermore has the advantage of stripping off the mass entrained at the circumferential surfaces of the rotor, so that it can not be further transported towards the suction area. It can thus be also prevented that entrained mass can possibly penetrate the vacuum extension. The sealing function here no longer depends on the geometry as well as the existing tolerances of the delivery mechanism parts. Even in case of high pressures in the pressure area, an adequate sealing is provided. The leakage flows can be reduced and thus the accuracy of the discharge or the portioning accuracy of the pump can also be increased with very different operational conditions. Due to the sealing element, the possible maximum pressure difference between pressure and suction areas can be maintained.

Advantageously, the sealing element is formed of a softer and/or more elastic material than the case, the vane and the rotor, so that a perfect sealing function is provided and the sealing element serves as inexpensive expendable part.

According to a preferred embodiment of the present disclosure, the case comprises a recess into which the sealing element is inserted so as to be replaceable. Thus, when delivery mechanism parts are worn, the sealing element can be easily and inexpensively exchanged. This makes it possible to increase the service life of the pump depending on its application and to ensure adequate sealing. Due to the fact that the sealing element can be adapted to the rotor geometry, high accuracy of the pump discharge or very accurate portion weights, respectively, can be achieved largely independent of the wear condition of the delivery mechanism parts.

Advantageously, the sealing element comprises a leakage channel which is at least partially opened towards the rotor. This leakage channel serves for removing pasty mass entrained at the circumferential surfaces of the rotor. Thus, even the mass that was not stripped off from the sealing element and that was nevertheless entrained can be removed through the leakage channel thus preventing this entrained pasty mass from being transported towards the suction area and reaching, for example, the vacuum extension. Thus, an impairment of the function or a damage of the vacuum pump can be effectively prevented.

Advantageously, the channel in the sealing element communicates with a leakage channel in a side plate covering the case or with a channel in the case through which the entrained material can be removed.

According to the present disclosure, the sealing element comprises n-sealing surfaces or sealing lips and n−1 leakage channels situated in-between, wherein n∈IN.

Due to the fact that the sealing element can be replaced, it can be, for example, also be easily cleaned.

In accordance with the disclosure, the vane pump preferably comprises a vacuum extension in the sealing area in the case, at least one sealing element being arranged in the sense of rotation upstream of the vacuum extension in order to protect the vacuum pump from harmful leaking mass. Advantageously, in the sense of rotation downstream of the vacuum extension, at least one further sealing element is provided in order to ensure adequate sealing between the vacuum extension and the suction area of the pump.

The sealing area here, for example, comprises the following structure:

a first sealing section with a first sealing gap formed between the rotor and the wall of the case, a second sealing section with at least one first sealing element, a third sealing section with a second sealing gap between the rotor and the wall of the case, and a fourth sealing section comprising at least one further sealing element. In this arrangement, the vacuum extension is arranged in the third sealing section.

The height h of the sealing element preferably corresponds to the height of the rotor and/or the pump vanes to realise ideal sealing.

By the employment of the sealing element according to the disclosure, the gap width s can be selected to be larger compared to prior art.

The sealing effect depends on the length of the sealing surfaces. Due to the fact that the gap width s can be freely selected and thus be restricted with the sealing element according to the disclosure, the length of the sealing area can be reduced compared to prior art. The areas obtained thereby can be utilized for optimising the function of the inlet and outlet areas of the pump case.

Advantageously, the pump vanes are laterally rounded at the end facing the case, so that these can be carefully passed along the sealing elements without being damaged.

BRIEF DESCRIPTION OF THE DRAWINGS

The disclosure will be illustrated below in greater detail with reference to the accompanying drawings.

DETAILED DESCRIPTION OF THE DISCLOSURE

Figure 2:
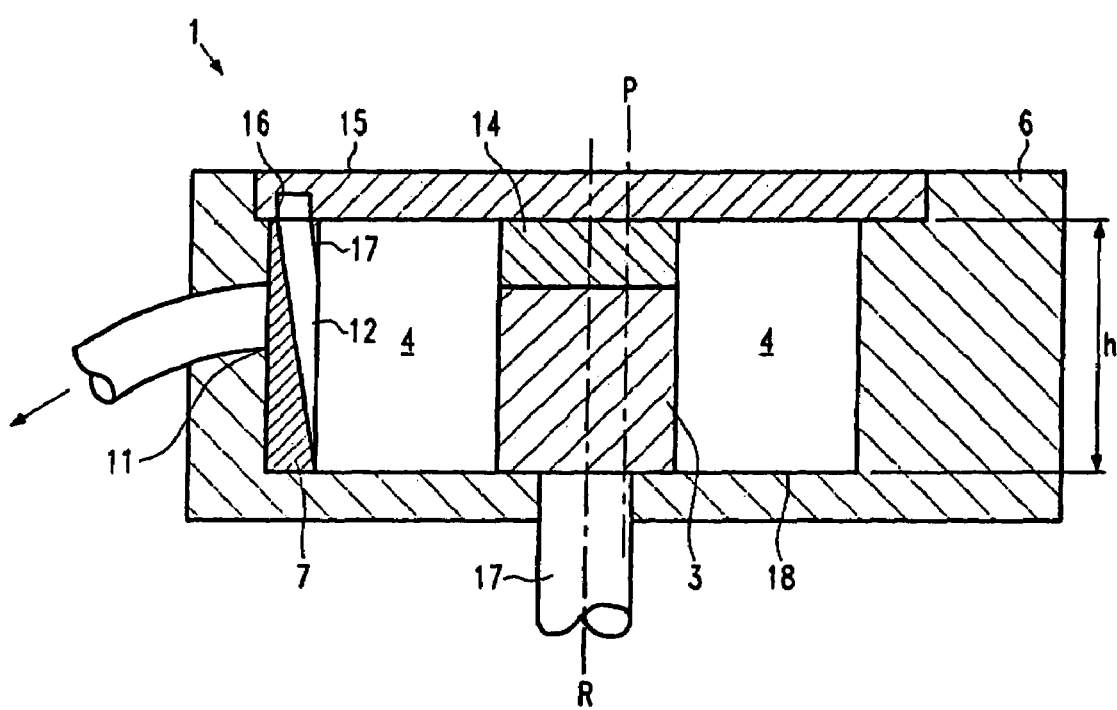
FIG. 2 shows a longitudinal section through a vane pump according to the disclosure.
Figure 3:
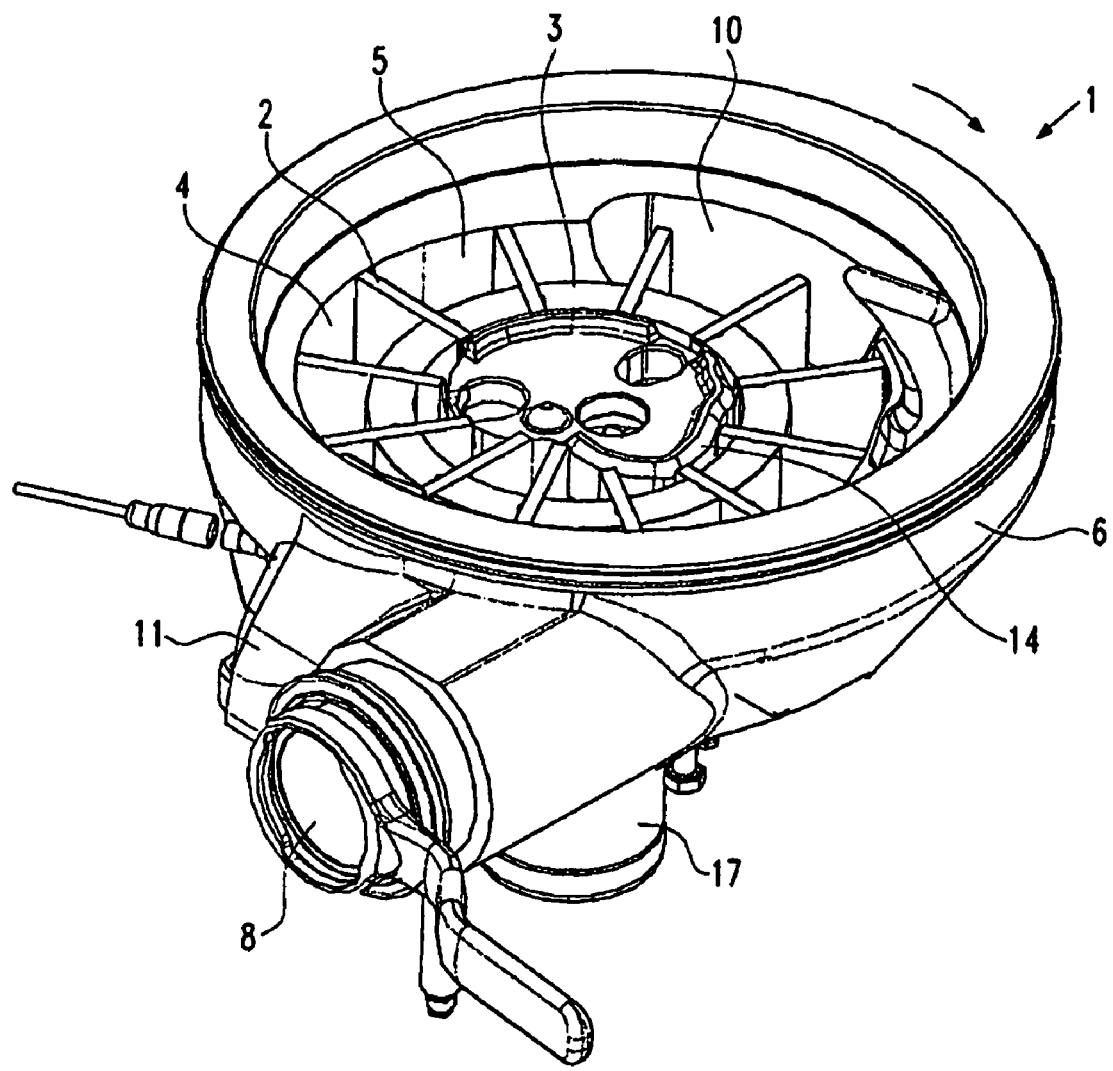
FIG. 3 shows a perspective representation of a vane pump.

FIG. 3 shows the perspective structure of the vane pump 1 according to the present disclosure. As can be taken from FIG. 3, the vane pump for delivering pasty mass, in particular sausage meat, comprises a pump case 6 as well as an inlet 10 for the pasty mass and an outlet 8 for the portioned mass. The inlet 10 is, for example, connected with an outlet of a hopper, e.g. a vacuum hopper (not shown) via which the pasty mass is supplied to the vane pump 1. The outlet 8 is, for example, connected to a filling tube (not shown) of a filling machine. Via the filling tube, the portioned pasty mass is then pushed into the sausage casings in a known manner. In the pump case 6, the vane pump 1 comprises a preferably eccentrically arranged rotor 3 that can be rotated and is driven via a pump shaft 17 about the axis R (see FIG. 2). As can be seen in FIG. 2, the central axis R of the rotor is spaced from the central axis P of the case 6.

The rotor comprises vanes 2 held so as to be radially movable which form delivery cells 4 together with the wall 5 of the pump case 6, the bottom 18 (see FIG. 2) of the case 6 as well as the side plate 15, i.e. the lid of the pump case, and cooperate in a sealing sense. In the embodiment which is shown in FIG. 3, the vane pump comprises a cam disk 14 passing the pump vanes 2 along the inner contour of the pump case 6. By rotation of the rotor or the vanes 2, respectively, pasty mass can be fed from the inlet 10 to the outlet 8 in the delivery mechanism chambers 4 in a known manner.

A pump can be generally subdivided into several areas. One of these areas is the suction area, another one is the pressure area where a sealing area separates the pressure area from the suction area. The pressure area starts in the sense of rotation downstream of the inlet 10 and extends down to the outlet 8. The sealing area that separates the pressure area from the suction area follows downstream of the pressure area which ends downstream of the outlet 8 in the sense of rotation of the rotor 3. The suction area is arranged downstream of the sealing area, as can be taken from FIG. 1, which e.g. starts at a location where the distance between the rotor 3 and the inner wall 5 of the case 6 is increased, such that the delivery cells 4 increase again. The suction area extends down to the end of the inlet 10. In the suction area, there are pressures from −1 bar to 0 bar.

Figure 1:
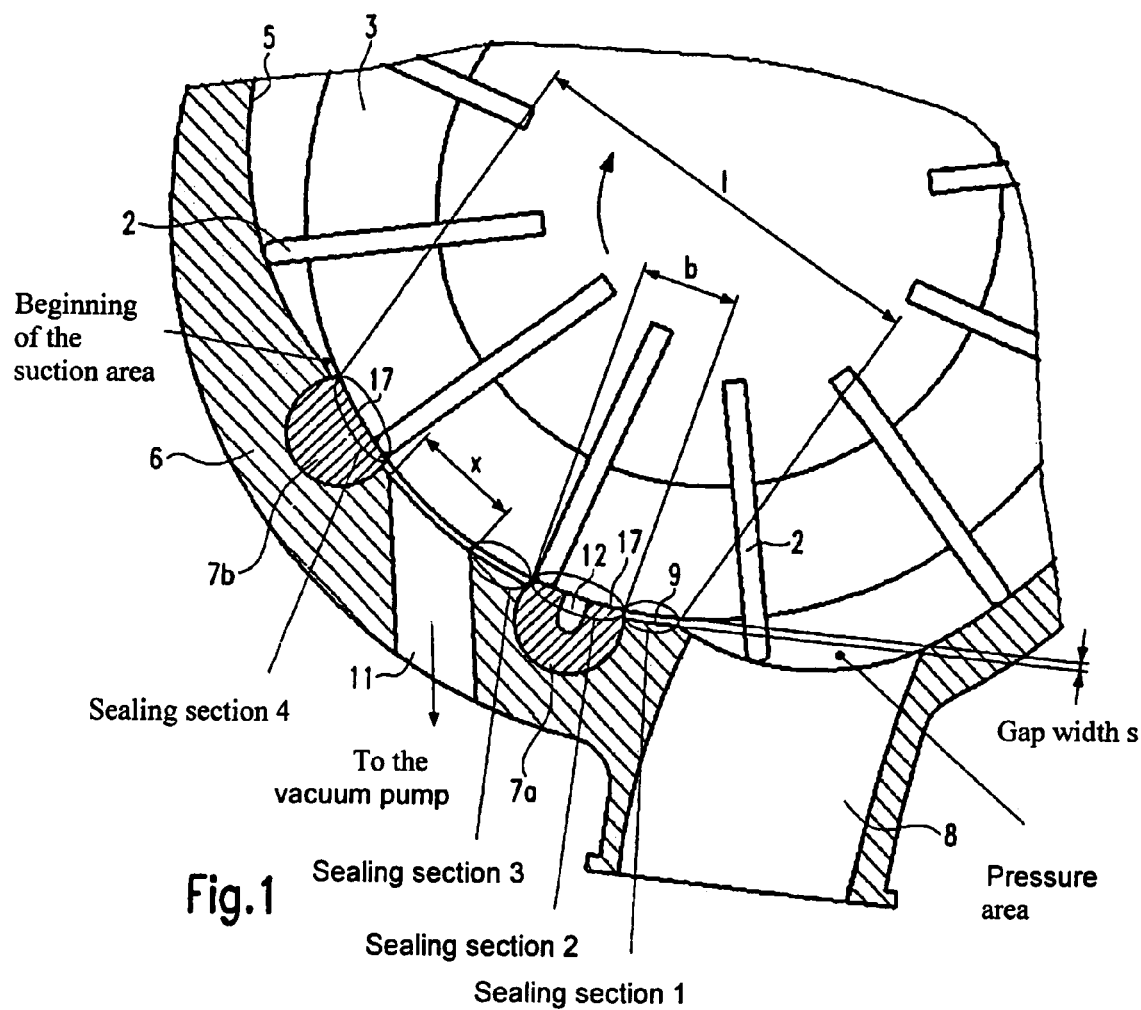
FIG. 1 shows a partial section through a vane pump according to the disclosure.

As can be in particular taken from FIGS. 1 and 2, in the sealing area, that means between the pressure area and the suction area, at least one sealing element 7a, b, is provided which seals the gap 9 between the rotor and the wall 5 of the pump case 6. The sealing element 7 can be fixedly received in a recess in the case 6, preferably, however, it is received loosely, i.e. so that it can be replaced and cleaned. This sealing element 7 can be incorporated between the pump case 6 and the rotor 3 so as to be elastically pretensioned. Preferably, however, the sealing element 7 is rigidly incorporated. The sealing element can be formed of a softer and/or more elastic material than the other delivery mechanism parts and thus serve as inexpensive expendable part. The sealing element 7 has the task of sealing the gap 9 in order to maintain a maximum possible pressure difference between the pressure and the suction areas. A further task of the sealing element 7 is to strip off the mass entrained at the circumferential surfaces of the rotor. That means, the sealing element is here also a stripping-off element. The height of the sealing element 7 preferably corresponds to the height of the rotor 3 or the vane 2, as can be seen in FIG. 2. Due to the fact that the sealing element 7 is received so as to be replaceable, it can be easily replaced and adapted to wear when delivery mechanism parts are worn. This permits to increase the service life of the pump depending on its application, without very expensive components, such as pump case, pump vanes, rotor, etc., having to be exchanged.

As material for the sealing element, for example one of the following group is possible: plastics, rubber, metal, etc.

As can be seen in FIGS. 1 and 2, at least the sealing element 7a arranged upstream of a vacuum extension 11 arranged in the pump case 6 preferably comprises a leakage channel 12. The vacuum extension 11 leads to a vacuum pump to generate a vacuum in the delivery cells 4 moving past the vacuum extension. For the pasty mass entrained at the circumferential surfaces of the rotor and not stripped off by the stripping-off effect of the sealing element 7 not to be transported further towards the vacuum extension 11, the leakage channel 12 that can receive the entrained mass is provided. The leakage channel 12 is at least partially opened towards the rotor 3, so that the entrained mass can be pressed into the groove or opening thus formed. Preferably, the leakage channel 12 or the groove or opening extends over the complete height h of the sealing element 7. As can be seen in FIG. 2, the channel 12 is connected to a leakage channel 16 in the side plate 15 covering the case 6, so that the entrained pasty mass can be removed. However, it is also conceivable for the leakage channel 12 to be connected to a further channel provided in the pump case. Thus, the vacuum pump can be effectively protected from harmful leaking mass. The sealing element 7 can comprise n-sealing surfaces or lips 17 and n−1 leakage channels 12 situated in-between (n∈IN). Advantageously, the sealing surfaces 17 contact the rotor 3 in such a manner that the rotor 3 can pass along the sealing surfaces.

As can be seen in FIG. 1, in the sense of rotation downstream of the vacuum extension 11, a further sealing element 7b is provided which serves the sealing between the vacuum extension 11 and the suction area of the pump.

That means, the sealing area in this embodiment comprises a first sealing section formed by a sealing gap 9 between the rotor 3 and the wall 5 of the case 6. In section 2 of the sealing area, then at least one sealing element is provided, in FIG. 1 one sealing element 7a. Preferably, this sealing element comprises at least one leakage channel 12 as described above. The sealing section 3 again comprises a sealing gap 9 with a corresponding gap width s, in this sealing section 3, the vacuum extension 11 being provided with a length X. The fourth sealing section follows which again comprises at least one sealing element 7b and seals the suction area 11 from the vacuum extension 11. In the sense of rotation of the rotor 3, the suction area is then provided downstream of the sealing element 7b, in which area the distance between the rotor and the wall 5 increases in order to increase the vane volume again and to suck in pasty mass.

The sealing effect essentially depends on the length of the sealing elements 7.

As can be seen in FIG. 1, the pump vanes 2 are rounded at their ends facing the case 6, such that they can well slide over the sealing elements 7. When the vanes 2 are moved in the transition from sealing section 1 to sealing section 2 or from sealing section 3 to sealing section 4 from the wall 5 to the sealing elements 7, the pump vanes 2 correspondingly move away from the case in the radial direction. To this end, the sealing elements 7 can also be slightly bevelled, for example in the transition areas between the sealing sections.

The sealing elements 7 can also comprise a combination of sealing surfaces and sealing lips.

According to the present disclosure, by the sealing element 7 or the sealing elements 7a, 7b, the gap width s of the gap 9 between the rotor 3 and the case 6 can be adjusted as desired. The geometry in the sealing section 2 can be varied by exchanging the sealing element and thus be adapted to different operating modes with different pressures, media, etc. When delivery mechanism parts are worn, the sealing element 7 can be easily exchanged, so that the gap can be exactly sealed again without replacing expensive delivery mechanism components in the process. This makes it possible to essentially increase the service life of the pump depending on its application.

By the employment of the sealing elements, the leaking flows can be reduced and thus the accuracy of the discharge or the portion weights of the pump can be increased even with very different operational conditions. Due to the fact that the sealing element 7 can be adapted to the rotor geometry, high accuracy of the pump discharge or very accurate portion weights can be achieved largely independent of the wear condition of the delivery mechanism parts.

The invention claimed is:

1. Vane pump for delivering pasty masses, in particular sausage meat, comprising a pump case having a wall, a rotatably held rotor comprising vanes held so as to be radially movable and which form delivery cells together with wall of the pump case, a suction area, a pressure area and a sealing area separating the pressure area from the suction area, and at least one sealing element provided in the sealing area for sealing a gap between the rotor and the wall of the pump case, and a vacuum extension in the sealing area in the pump case, at least one sealing element being arranged in the sense of rotation upstream of the vacuum extension.

2. Vane pump according to claim 1, wherein the sealing element is formed of one of a softer and a more elastic material than the case, the vanes and the rotor.

3. Vane pump according to claim 1, wherein the case comprises a recess into which the sealing element is inserted so as to be replaceable.

4. Vane pump according to claim 1, wherein the sealing element comprises a leakage channel opened at least partially towards the rotor for removing pasty mass entrained at the circumferential surfaces of the rotor.

5. Vane pump according to claim 4, wherein the leakage channel is in communication with one of a leakage channel in a side plate covering the case, or with a leakage channel in the case to remove the entrained pasty mass.

6. Vane pump according to claim 4, wherein the sealing element comprises n-sealing surfaces and n−1 leakage channels situated in-between (n∈IN).

7. Vane pump according to claim 6, wherein each of the sealing surfaces is a lip.

8. Vane pump according to claim 1, and at least one further sealing element is arranged in the sense of rotation downstream of the vacuum extension.

9. Vane pump according to claim 1, wherein the sealing area comprises the following structure:
   a first sealing section with a first sealing gap formed between the rotor and the wall of the case,
   a second sealing section with at least one first sealing element,
   a third sealing section with a second sealing gap formed between the rotor and the wall of the case,
   and a fourth sealing section comprising at least one further sealing element.

10. Vane pump according to claim 9, wherein the vacuum extension is arranged in the third sealing section.

11. Vane pump according to claim 1, wherein the height h of the sealing element corresponds to the height of one of the rotor and the pump vanes.

12. Vane pump according to claim 1, wherein the pump vanes are laterally rounded at their ends facing the case.

13. Vane pump for delivering pasty masses, in particular sausage meat, comprising a pump case having a wall, a rotatably held rotor comprising vanes held so as to be radially movable and which form delivery cells together with the wall of the pump case, a suction area, a pressure area and a sealing area separating the pressure area from the suction area, at least one sealing element provided in the sealing area for sealing a gap between the rotor and the wall of the pump case, the sealing element comprising a leakage channel opened at least partially towards the rotor for removing pasty mass entrained at the circumferential surfaces of the rotor, and the leakage channel being in communication with one of a leakage channel in a side plate covering the case, or with a leakage channel in the case to remove the entrained pastry mass.

14. Vane pump for delivering pasty masses, in particular sausage meat, comprising a pump case having a wall, a rotatably held rotor comprising vanes held so as to be radially movable and which form delivery cells together with the wall of the pump case, a suction area, a pressure area and a sealing area separating the pressure area from the suction area, at least one sealing element provided in the sealing area for sealing a gap between the rotor and the wall of the pump case, the sealing element comprising a leakage channel opened at least partially towards the rotor for removing pasty mass entrained at the circumferential surfaces of the rotor, and the sealing element comprising n-sealing surfaces and n−1 leakage channels situated in-between (n∈IN).

15. Vane pump for delivering pasty masses, in particular sausage meat, comprising a pump case having a wall, a rotatably held rotor comprising vanes held so as to be radially movable and which form delivery cells together with the wall of the pump case, a suction area, a pressure area and a sealing area separating the pressure area from the suction area, at least one sealing element provided in the sealing area for sealing a gap between the rotor and the wall of the pump case, a vacuum extension in the sealing area in the case, at least one sealing element being arranged in the sense of rotation upstream of the vacuum extension, and with the sealing area comprising the following structure:

- a first sealing section with a first sealing gap formed between the rotor and the wall of the case,
- a second sealing section with at least one first sealing element,
- a third sealing section with a second sealing gap formed between the rotor and the wall of the case, and
- a fourth sealing section comprising at least one further sealing element.

16. Vane pump according to claim 15, wherein the vacuum extension is arranged in the third sealing section.

17. Vane pump for delivering pasty masses, in particular sausage meat, comprising a pump case having a wall, a rotatably held rotor comprising vanes held so as to be radially movable and which form delivery cells together with the wall of the pump case, a suction area, a pressure area and a sealing area separating the pressure area from the suction area, at least one sealing element provided in the sealing area for sealing a gap between the rotor and the wall of the pump case, the sealing element comprising a leakage channel opened at least partially towards the rotor for removing pasty mass entrained at the circumferential surfaces of the rotor, and the sealing element comprising n-sealing surfaces and n−1 leakage channels situated in-between (n∈IN), and each of the sealing surfaces is a lip.

* * * * *